Dec. 27, 1932.  F. B. PFEIFFER  1,892,629
METHOD OF AND APPARATUS FOR MAKING TUBING
Original Filed April 26, 1930   3 Sheets-Sheet 1
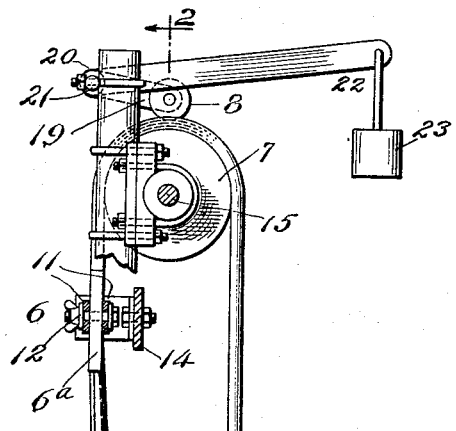
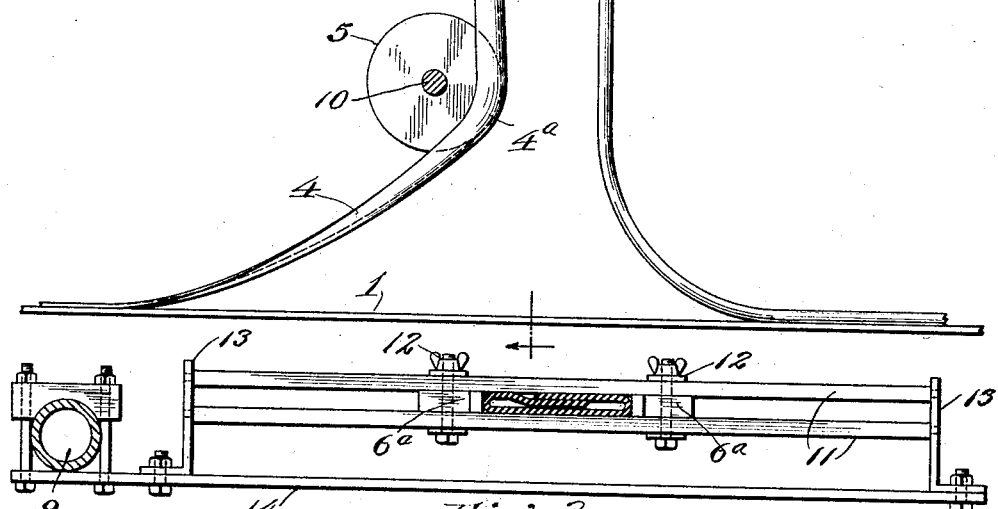
INVENTOR
Fred B. Pfeiffer
BY
ATTORNEYS Dec. 27, 1932.   F. B. PFEIFFER   1,892,629
METHOD OF AND APPARATUS FOR MAKING TUBING
Original Filed April 26, 1930   3 Sheets-Sheet 2
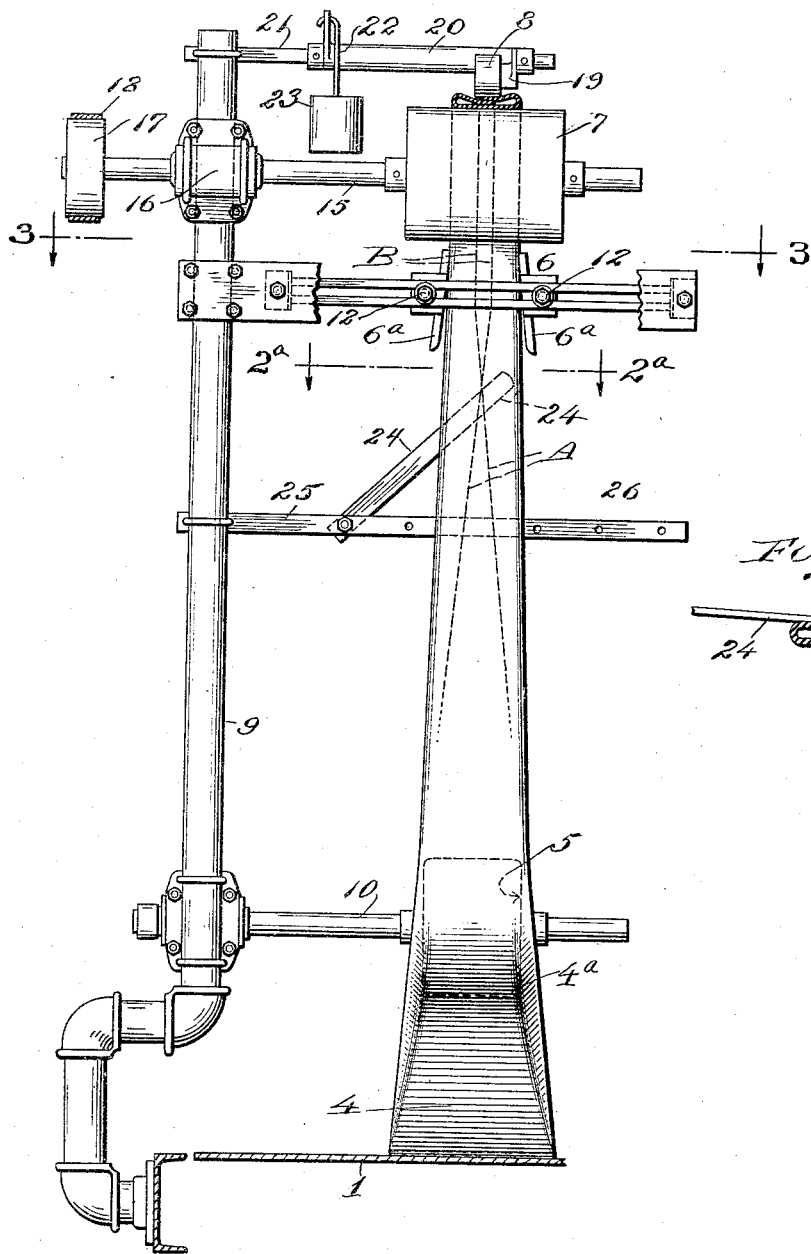
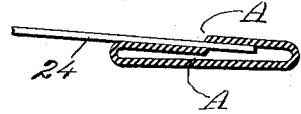
INVENTOR
Fred B. Pfeiffer
BY
Morrison Kennedy Campbell
ATTORNEYS

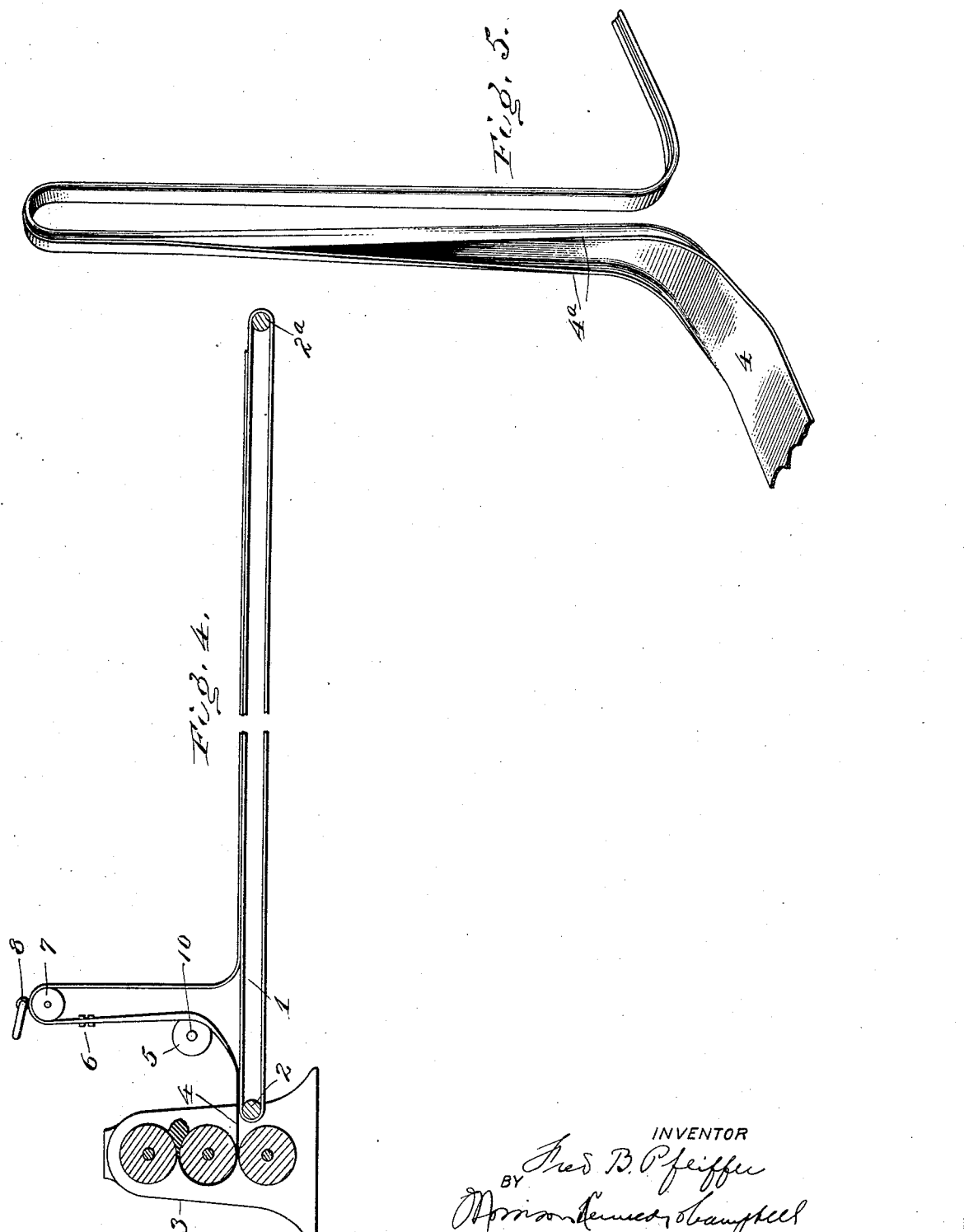

Patented Dec. 27, 1932

1,892,629

UNITED STATES PATENT OFFICE

FRED B. PFEIFFER, OF AKRON, OHIO, ASSIGNOR TO SEIBERLING RUBBER COMPANY, A CORPORATION OF DELAWARE

METHOD OF AND APPARATUS FOR MAKING TUBING

Application filed April 26, 1930, Serial No. 447,531. Renewed May 27, 1932.

This invention relates to the manufacture of tubing for use more particularly in making inner tubes for pneumatic tire casings, and involves the method of procedure and apparatus for practicing the same, in which tube stock in sheet form is by improved means shaped into a continuous tube, which is subsequently cut into appropriate lengths, and these lengths bent into annular form and united at their ends to form the individual inner tubes.

The aim of the invention is to simplify the operations involved, and to produce said tubes at less expense, with greater ease and rapidity, and at the expenditure of less time, labor and trouble, than has been possible under the methods and practices heretofore resorted to.

Under one method of procedure now commonly practiced in the manufacture of inner tubes, and involving many manual operations, the tube stock from the calender is wound in a fabric liner into a roll, which is usually placed in storage for a greater or less period of time until needed for use. The roll is then transported to a tube rolling table, where it is mounted for rotation at one end of the table, and the stock unwound from the roll and laid across the table. By means of a hand cutting tool, the unwound stock is severed transversely to separate a suitable length or blank from which to make an inner tube, and this blank is rolled upon a mandrel or pole into tubular form, and finally the ends of the tube are brought together and spliced to complete the inner tube.

In some cases, the calendered stock is first cut into tube lengths, and then stored away between liners in "bookform", these books later being brought to the tube rolling table and used as the source of supply. Here, too, the numerous manual operations required consume much time and labor.

Under a second common method, known as the "drum method," the calendered stock (prepared and handled preliminarily as in the first method just described) has a suitable length cut from it, which length is laid around a drum and its ends united to form a cylinder of substantially the diameter of the circular finished inner tube. The outer edges of this cylinder are then turned in by hand, or by the use of suitable means, and stitched together to form a closed tube ready for vulcanization.

Both of these methods involve many handlings of the material before the final stage of tube formation is reached, and consequently, they consume much time and labor, and are attended with corresponding expense; and in both methods, the material is severed into the lengths required before said lengths are shaped into tubular form.

Under a third method, known as the "tubing method", the plastic tube stock, rather than being calendered to give it sheet form, is extruded as a continuous tube through an extrusion die, and the tube as thus formed is cut into suitable lengths, and these lengths bent around into annular form and their ends united to constitute the complete tubes. While this method involves simplicity and directness in the handling operations, it is not entirely satisfactory for practical purposes, by reason of the character of material being dealt with and many unstable conditions both as to the material and as to the extruding action, since the walls of the extruded tube will not always be of a uniform thickness, and thin or weak spots in the walls are apt to occur, which, under the heavy inflating pressure to which the tube in practice is subjected, and the sudden increase of pressure occurring in use, will give way.

The present invention obviates these objections by subjecting tube stock in sheet form to a folding action by an improved method and mechanism, to give the sheet material the form of a continuous tube, which tube may be severed into appropriate lengths, and these lengths bent around into annular form and their ends joined together to constitute the individual inner tubes, it being preferable, as will later appear, to act on sheet stock directly as it comes from the calender, or from a supply roll of calendered sheet stock.

In such procedure, the number of handling operations incident to the first two previous methods is greatly reduced, and the tube forming operation therefore much simplified;

and the fault of walls of uneven thickness and weak spots therein, incident to the third method, is overcome, since with the tube formed by folding sheet material in accordance with the present invention, the walls of the tube will be of the thickness of the sheet, and there will be no chance for the formation of weak or thin spots therein.

An important feature of the invention involves the operation of the folding devices on the sheet while it is in such position that it will be free from disturbing forces or influences, such as gravity, friction, etc., which would otherwise tend to interfere with the proper manipulation of the sheet by the feeding and folding devices. The most favorable position is a vertical, or substantially vertical, path in which the sheet is caused to travel while being subjected to the folding operations.

In the specification to follow, the invention will be described in detail, and the novel features thereof will be pointed out in the appended claims.

In the accompanying drawings:

Fig. 1 is a side elevation, partly in section, of an apparatus suitable for practicing the invention, a portion only of the upper stretch of the conveyor belt being shown;

Fig. 2 is a vertical sectional elevation on the line 2—2 of Fig. 1, looking in the direction of the arrows in said figure;

Fig. 2ª is a horizontal section on an enlarged scale on the line 2ª—2ª of Fig. 2;

Fig. 3 is a horizontal sectional plan view on an enlarged scale on the line 3—3 of Fig. 2;

Fig. 4 is a view in side elevation, somewhat in the nature of a diagram, showing the improved apparatus in cooperative relation to a calender to receive the calendered sheet directly therefrom; and Fig. 5 is a perspective view, showing the progressive folding of the side edges of the flat sheet in its upward travel in forming the tube.

Referring to the drawings:—

Referring particularly to Fig. 4, which illustrates the preferred manner of practicing the invention, it will be seen that a horizontal conveyor in the form of an endless belt 1, passing at its ends around front and rear rolls 2 and 2ª, is arranged with its receiving end adjacent the discharge rolls of a calender 3 in position to receive directly from said calender, the calendered tube stock in the form of a continuous sheet 4. From the receiving end of the belt, the sheet is led upwardly and around an idler roller 5 mounted over the receiving end of the belt on a horizontal transverse axis, the sheet in its passage around the roller and in its upward travel being folded into tubular form by the roller 5 and a cooperating device 6 above the same in the manner to be more particularly described later on. In this folded form, the stock passes onto and over a driving roller 7 mounted substantially vertically above the idler roller on a horizontal transverse axis; and in passing over said driving roller, the folds of the tube are acted on by a seam stitcher 8, by which said folds are united to complete the formation of the tube. At the same time, the feed roller acts to draw the sheet material from the conveyor upwardly and around the idler roller, and acts also to direct the finished tube back onto the conveyor belt at a point beyond that where the unformed sheet was first received by the belt, whereby the conveyor will carry the completed tube away for further treatment and use.

As best shown in Fig. 2, the idler roller 5, the cooperating folding device 6, the driving roller 7 and the seam stitcher 8, are all mounted on and sustained by a fixed standard 9 extending upwardly from a suitable base frame at a point adjacent the receiving end of the conveyor belt at one side thereof, the front supporting roll 2 of which is mounted, as shown in Fig. 4, in the calender frame so that the calendered sheet will be received directly onto the front or receiving end of the belt.

The idler roller 5 is mounted for free rotation on a horizontal axle 10 which is fastened at its outer end to the standard 9 and extends transversely over the conveyor belt so as to support the idler roller a short distance vertically above the receiving end thereof. This roller is of less width than that of the sheet stock, the result being that as the sheet is drawn around the far side of the roller and upwardly therefrom as best shown in Fig. 1, the side edges 4ª of the sheet will be turned in and will lap around the ends of the roller, by which action the folding of the sheet into a tube is initiated.

In the upward travel of the sheet to the feed roller 7, the inturned edges are operated on by the device 6 before alluded to, which acts to fold said edges inwardly towards each other and overlap them to cause the sheet to take tubular form. This device consists of a pair of vertically extending horizontally spaced folding plates 6ª, mounted for adjustment transversely of the travel of the sheet, between horizontal parallel rails 11, by means of adjustable clamping bolts 12, the said plates converging towards each other from their lower ends to their upper ends. The rails 11 are supported by brackets 13 from a plate 14, which is clipped at its outer end to the said standard 9 in such a position that the folding plates will be supported between the idler roller and feed roller in the path of the sheet as it is drawn upwardly onto the feed roller, which sheet in its travel will pass between said folding plates. In such passage, the inturned edges of the sheet will be gradually folded-in in overlapping relations, said edges first approaching each other at an angle as shown at A in Fig. 2, and then gradually assuming parallel relation to each other, as shown at B in said figure, in which folded condition, the sheet passes onto and over the feed roller.

The feed roller 7 is carried by a horizontal transversely extending driving shaft 15, rotatably mounted in a bearing 16 clipped to the standard 9 above the plate 14, a driving pulley 17 being fixed to the shaft and driven by a belt 18 receiving its motion from a suitable source of power.

After the sheet in completely folded form passes onto the feed roller 7, it remains to unite the overlapping edges thereof in order to complete the formation of the tube, and this is effected, as before stated, by a seam stitcher 8, which in the present instance is in the form of a pressure roller journalled on the end of an arm 19 projecting from the inner end of a sleeve 20 rockably mounted on a horizontal transverse axle 21 clipped at its outer end to the standard 9 above the shaft 15. The inner end of the sleeve is provided with an arm 22 on which is hung a weight 23, the tendency of which is to urge the pressure roller down with yielding pressure on the center of the tube passing around the feed roller, whereby the overlapping edges of said tube will be firmly pressed together, and due to the tacky surface of the calendered sheet, said edges will be caused to firmly unite.

Arranged between the idler roller 5 and the folding plates 6ª is a device in the form of a flat plate or finger 24, which at its end extends between the folded edges of the sheet and acts to keep said edges separated from each other before they finally assume their parallel relation. This plate is fixed at its lower end to a horizontal arm 25 fastened at its outer end to the standard 9, and it extends upwardly in an oblique direction from said arm so as to project in between the two folded edges of the sheet as they approach at an angle to each other. Provision is made, as by the formation of holes 26 at intervals in the arm 25, to adjust the plate 24 relative to the traveling sheet to meet the varying conditions encountered in practice.

It is not necessary in the folding of the sheet into tubular form, that the inturned edges of the sheet be caused to overlap as just described, since these edges could be caused to abut against each other and the abutting joint subsequently sealed.

As has been described, and as shown, the sheet is subjected to the folding operations while it is traveling in a vertical direction, and I deem this feature of great importance and advantage, in that by the vertical position of the sheet, the inturned edges will not be subject to any force or influence tending to interfere with or disturb their proper manipulation by the folding devices in giving the sheet its tubular form. Such vertical position of the sheet prevents the action of gravity from affecting the position of the inturned edges, so that these edges in their travel being free from any force tending to fold them prematurely against the main body of the sheet or the folding devices, the latter are better enabled to perform their required functions, than if the sheet were carried in horizontal position while being subjected to the folding operations, in which case the action of gravity coming into full play would interfere with and prevent the folding devices from performing their intended functions in the proper manner.

It will be manifest that, while in the accompanying drawings and foregoing description, the folding devices are shown as acting on the sheet in its upward travel, this arrangement could be reversed and the sheet caused to travel downwardly while the folding devices are operating.

While as shown, it is preferable when employing calendered stock, to act on the same by the folding devices, directly as it leaves the calender, it will be understood that as far as the advantages derived from the support of the sheet in an upright position during the folding operation is concerned, the sheet could as well be first wound into a roll as it comes from the calender, and then taken from the roll and led upwardly for the tube forming operation. The invention is not therefore limited, in this respect. to the supply of the sheet stock to the folding devices, directly from a calender.

It may be necessary or desirable to dust the central surface of the sheet on its front side with soap stone, or other suitable and appropriate material, to prevent the inner fold from sticking to said surface in the action of the seam stitcher in uniting the folded edges.

While in the foregoing description and accompanying drawings the invention has been set forth in the particular detailed form and method of procedure which have been found to answer to a satisfactory degree the ends to be attained, it will be manifest that these details may be variously changed and modified without departing from the spirit of the invention; and it will be understood that the invention is not limited to any particular form or construction of parts or in respect to the method of procedure, except in so far as such limitations are specified in the claims.

Having thus described my invention, what I claim is:—

1. The method of making tubing for the production of inner tubes, which consists in providing a length of tube stock in sheet form, feeding said length linearly and subjecting the same in its travel to a continuous folding operation to give it the form of a continuous tube, the portion of the traveling stock subjected to the folding operation being caused to occupy such position that the force of gravity will not tend to interfere with the folding operation.

2. The method of making tubing for the production of inner tubes, which consists in providing a length of tube stock in sheet form, feeding said length linearly in a vertical or substantially vertical direction, and subjecting the same in its vertical travel to a continuous folding operation to give it the form of a continuous tube.

3. The method of making tubing for the production of inner tubes, which consists in providing a length of tube stock in sheet form, feeding said length linearly in an upward direction, and subjecting the same in its upward travel to a continuous folding operation to give it the form of a continuous tube; whereby the tube may be severed into appropriate sections for the formation of individual inner tubes.

4. The method of making tubing for the production of inner tubes, which consists in continuously feeding calendered stock, directly as it issues from the calender, linearly and in a vertical or substantially vertical direction, and subjecting the same in its vertical travel to a continuous folding operation to give it the form of a continuous tube to be subsequently severed into appropriate lengths for individual inner tubes.

5. In the method of making tubing for the production of inner tubes, providing a length of tube stock in sheet form, continuously feeding said length linearly in a vertical or substantially vertical direction, continuously folding the side edges of the sheet in its vertical travel inwardly towards each other, and finally joining said edges together to form a continuous tube.

6. The method of making tubing for the production of inner tubes, which consists in providing a length of tube stock in sheet form, continuously feeding said length linearly in a vertical or substantially vertical direction, continuously folding the side edges of the sheet in its vertical travel inwardly towards each other and overlapping said edges, and finally joining said overlapped edges together to form a continuous tube.

7. The method of making tubing for the production of inner tubes, which consists in providing a length of tube stock in sheet form, continuously feeding said length linearly in an upward direction, continuously folding the side edges of the sheet in its upward travel inwardly towards each other and overlapping said edges, and finally joining said edges together to form a continuous tube.

8. The method of making tubing for the production of inner tubes, which consists in leading tube stock in sheet form around and upwardly from an idler roller of less width than that of the sheet to cause the side edges of the sheet to turn inwardly at the ends of the roller, subjecting the inturned edges of the sheet in their upward travel to a folding operation to cause them to overlap, uniting said overlapping edges to form a tube, and subjecting said tube to endwise pull to advance the stock around the idler roller.

9. The method of making tubing for the production of inner tubes, which consists in feeding tube stock in sheet form in a vertical or substantially vertical direction, while subjecting the same in its vertical travel to a folding operation to turn in and overlap the side edges of the sheet, and subjecting said overlapping edges to pressure to cause them to unite and form a tube.

10. The method of making tubing for the production of inner tubes, which consists in leading tube stock in sheet form upwardly while subjecting the same in its upward travel to a folding operation to turn in and overlap the side edges of the sheet, and subjecting said overlapping edges to rolling pressure to cause them to unite and form a tube.

11. In apparatus for forming tubing from tube stock in sheet form, the combination of means for causing the sheet to travel in a vertical or substantially vertical direction, and means acting on the sheet in its vertical travel to turn in its side edges to give the sheet generally tubular form.

12. In apparatus for forming tubing from tube stock in sheet form, the combination of means for guiding the sheet in a vertical or substantially vertical direction, means acting on the sheet in its vertical travel to turn in its side edges to give the sheet tubular form, and means for uniting said edges to complete the tube.

13. In apparatus for forming tubing from tube stock in sheet form, the combination of means for guiding the sheet to travel in an upward direction, means acting on the upwardly traveling sheet to turn in its side edges and overlap the same to give the sheet generally tubular form, and means for uniting said overlapping edges to complete the tube.

14. In apparatus for forming tubing from tube stock in sheet form, the combination of an idler roller rotatable about a horizontal axis and of less width than that of the sheet, around which roller the sheet is adapted to pass, a feed roller arranged vertically or substantially so in relation to the idler roller and operable on the sheet to draw the same around the idler roller, whereby the side edges of the sheet will be turned inwardly at the ends of the idler roller, devices acting on the inturned edges of the sheet to fold them in joining relation before passing onto the feed roller, and means for driving the feed roller.

15. In apparatus for forming tubing from tube stock in sheet form, the combination of an idler roller rotatable about a horizontal axis and of less width than that of the sheet, around which roller the sheet is adapted to pass, a feed roller arranged vertically or substantially so in relation to the idler roller and operative on the stock to draw the same around the idler roller, whereby the side edges of the sheet will be turned inwardly at the ends of the idler roller, fixed spaced devices located between the idler roller and feed roller, and between which devices the inturned edges of the sheet are adapted to pass and by which they are folded in joining relation before passing onto the feed roller, and means whereby said edges are united to complete the tube.

16. In combination with a calender, a traveling conveyor in position to receive the calendered stock in sheet form directly therefrom, an idler roller mounted above said conveyor on a horizontal axis and of less width than that of the sheet, and in position to have the sheet pass upwardly around it from the conveyor, means acting in the upward travel of the sheet to fold its side edges in an overlapping relation, and means acting on said overlapping edges to unite them to form a tube and exerting a pull endwise on the tube.

17. In an apparatus for forming tubing from tube stock in sheet form, the combination of means for guiding the sheet to travel in a vertical or substantially vertical direction, means acting on the sheet in its travel to fold its side edges in overlapping relation before being united in parallel relation in the form of a tube, and a separating device in position to extend between said overlapping edges and prevent their contact with each other before assuming said parallel relation.

In testimony whereof, this specification has been duly signed.

FRED B. PFEIFFER.